United States Patent [19]

Grundmann et al.

[11] Patent Number: 5,306,132
[45] Date of Patent: Apr. 26, 1994

[54] PROCESS AND APPARATUS FOR DEGASSING PLASTIC MELT IN A SCREW EXTRUDER

[75] Inventors: Andre Grundmann, Ludwigsburg; Dieter Rath, Esslingen, both of Fed. Rep. of Germany

[73] Assignee: Werner & Pfleiderer GmbH, Stuttgart, Fed. Rep. of Germany

[21] Appl. No.: 661,560

[22] Filed: Feb. 26, 1991

[30] Foreign Application Priority Data

Apr. 3, 1990 [DE] Fed. Rep. of Germany ....... 4010692

[51] Int. Cl.⁵ ............................................. B29C 47/36
[52] U.S. Cl. ..................................... 425/203; 264/101; 264/102; 366/75; 425/200; 425/204
[58] Field of Search ............... 425/200, 203, 204; 264/107, 102; 366/75

[56] References Cited

U.S. PATENT DOCUMENTS

| | | | |
|---|---|---|---|
| 2,736,058 | 2/1956 | Dellheim | 425/203 |
| 3,657,195 | 4/1972 | Doerfel et al. | 425/203 |
| 4,314,765 | 2/1982 | Hotz | 425/203 |
| 4,776,784 | 10/1988 | Batiuk | 425/203 |
| 4,877,390 | 10/1989 | Ocker et al. | 425/203 |

*Primary Examiner*—David A. Simmons
*Assistant Examiner*—William Matney
*Attorney, Agent, or Firm*—Ladas & Parry

[57] ABSTRACT

A process and a degassing unit for the degassing of plastic melt in a screw extruder in which a surface of the degassing unit facing the screws of the extruder are heated to prevent deposition of entrained plastic particles, particularly at the corners or edges of the degassing unit. Prior to the commencement of the treatment process, the degassing unit is heated to a temperature which is at least as high as the melting point of the plastic to be treated. Heating can be effected by conveying a heating medium through a channel in the degassing unit located in proximity to the surface facing the extrusion screws and especially the corner or edge regions.

19 Claims, 3 Drawing Sheets

PROCESS AND APPARATUS FOR DEGASSING PLASTIC MELT IN A SCREW EXTRUDER

FIELD OF THE INVENTION

The invention relates to the treatment of plastic melt in a screw extruder and particularly to a process and a degassing unit for degassing the plastic melt treated in the screw extruder, specifically by a mode of heating the degassing unit to prevent accumulation of plastic particles thereon especially at corner or edge regions thereof.

BACKGROUND AND PRIOR ART

The degassing of volatile components from a polymer melt or solution is an important process step in the manufacture and treatment of plastic materials. Of decisive significance for the correct degassing of a specific type of plastic material and for maintaining operational safety is the arrangement and configuration of degassing openings in the housing of the screw extruder. It is known (H. Werner, Degassing of Plastics, Kunststoffe 71 (1981) 1, p. 23, FIG. 11), that degassing housings of various configurations can be utilized with or without ancillary degassing units for the screw extruders, depending on the vapor velocities that are produced and the tendency of the product to foam in the degassing zone in the extruder. The ancillary units can have a configuration which completely or partially covers the "wedge" region of two overlapping extrusion screws. Even if the ancillary degassing units are specially shaped to correspond to the prevailing flows in the degassing zone of the extruder, separation of particles from the plastic melt being processed cannot be avoided, particularly during start-up and when fluctuations in throughput occur. These separated particles adhere to the outer surfaces of the degassing unit and housing as well as on the inner wall of the degassing dome to form solid residues thereat. This produces a constricting of the cross section resulting in higher gas velocities which cause the entrained particles in the gas current to be increased.

The thus formed residues decompose under the effect of temperature and drop, almost decomposed, onto the screws after a certain period of time, and adversely affect the quality of the melt product. In addition, depositions at corners or edges of the degassing unit can become detached and drop into the melt at any time and cause melt contamination.

In order to eliminate the formation of depositions in the degassing dome, it is known from U.S. Pat. No. 3,078,512, to employ a displaceable unit, which has exactly the same contour shape as the degassing dome. The depositions in the degassing dome are removed and reintroduced into the screw extruder by periodic displacement of this unit by a hand lever system.

This system is relatively expensive and even if the degassing dome remains free of depositions by precise monitoring of the formation of depositions and corresponding operation of the displaceable unit, depositions on the surface of the unit facing the screws cannot be eliminated. Unfortunately, this is where most of the plastic particles are deposited.

SUMMARY OF THE INVENTION

An object of the invention is to provide a process and apparatus for degassing plastic melt in a screw extruder, which effectively prevents deposition of separated plastic particles on the surfaces of a degassing unit mounted in the extruder housing and especially at the corner or edge regions of the degassing unit.

The above and further objects are satisfied by the process of the invention which comprises heating the degassing unit to a temperature at least as high as the melting point of the plastic melt so that plastic from the melt which contacts the degassing unit will liquefy and return to the melt. The process of the invention is particularly addressed to heating the degassing unit at corners or edges thereof whereat the particles of plastic melt accumulate.

In the case of double screw extruders, the degassing unit is heated at the surface thereof directly facing a wedge-like region of the surfaces of the overlapping threads of the two screws of the extruder. Hereat, the surface of the degassing unit has two corners or edges in the form of cusps and the heat is supplied in the region of the cusps.

The above and further objects are further satisfied by apparatus of the invention according to which the degassing unit is mounted in the housing of the screw extruder with a surface facing the extrusion screw and the degassing unit is provided with means for heating the degassing unit so that at said surface the temperature will be at least as high as the melting point of the plastic melt.

In a particularly advantageous embodiment, the heating means comprises means for conveying a heated medium, preferably a fluid, through the degassing unit over the length of the opening in the extruder housing at which gas escapes from the melt. Advantageously, the fluid is conveyed in a channel in the degassing unit located in proximity to the surface thereof facing the extrusion screw and especially in proximity to a corner or edge of the degassing unit. When two screws with overlapping threads are utilized in the extruder, the degassing unit faces a wedge region formed by the surfaces of the overlapping screw threads and the surface of the degassing unit is formed with an additional corner or edge region in the form of a cusp, the channel being disposed in the degassing unit proximate said cusp.

Hence, a deposition of entrained plastic particles on the degassing unit is effectively prevented. Even at the time of start-up of the process, the formation of depositions is prevented as it is contemplated that the degassing unit is already preheated. In this way, it is assured that a constant cross section of the removed gas is always present in the course of the extrusion process, and there will no longer be any reduction in the quality of the plastic melt due to the presence of decomposed depositions.

The invention contemplates heating the degassing unit at its surface facing the extrusion screw. This has the advantageous feature of being most effective while saving heating energy by confining the heating to the region most at risk of accumulating separated melt particles.

DETAILED DESCRIPTION OF PREFERRED EMBODIMENTS

Figure 1:
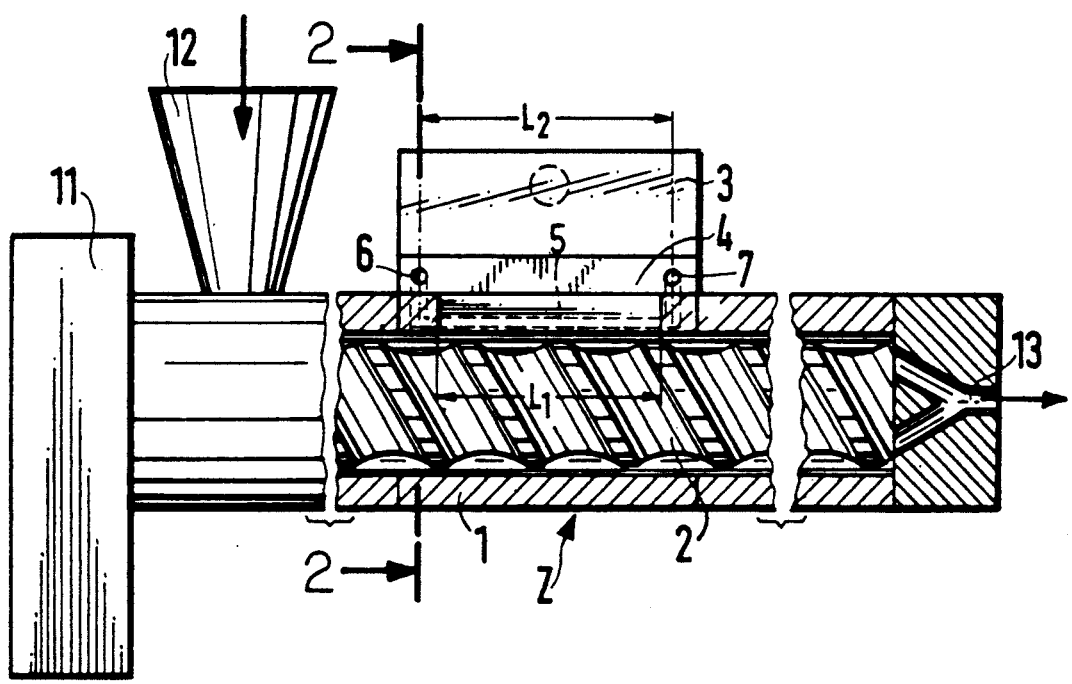
FIG. 1 shows a simplified representation of a screw extruder partially in section.

In the drawings is seen a screw extruder for a plastic melt which extruder comprises a housing 1 in which two adjacent extrusion screws 2 are rotatably driven in the same direction by a drive means 11. The housing 1 is preferably heated. The screws 2 have overlapping threads as evident from FIGS. 2 and 3. Plastic material to be treated is introduced at an inlet 12 and the plastic material is longitudinally advanced in successive treatment zones along the extruder and exits as a treated product at discharge outlet 13.

Figure 2:
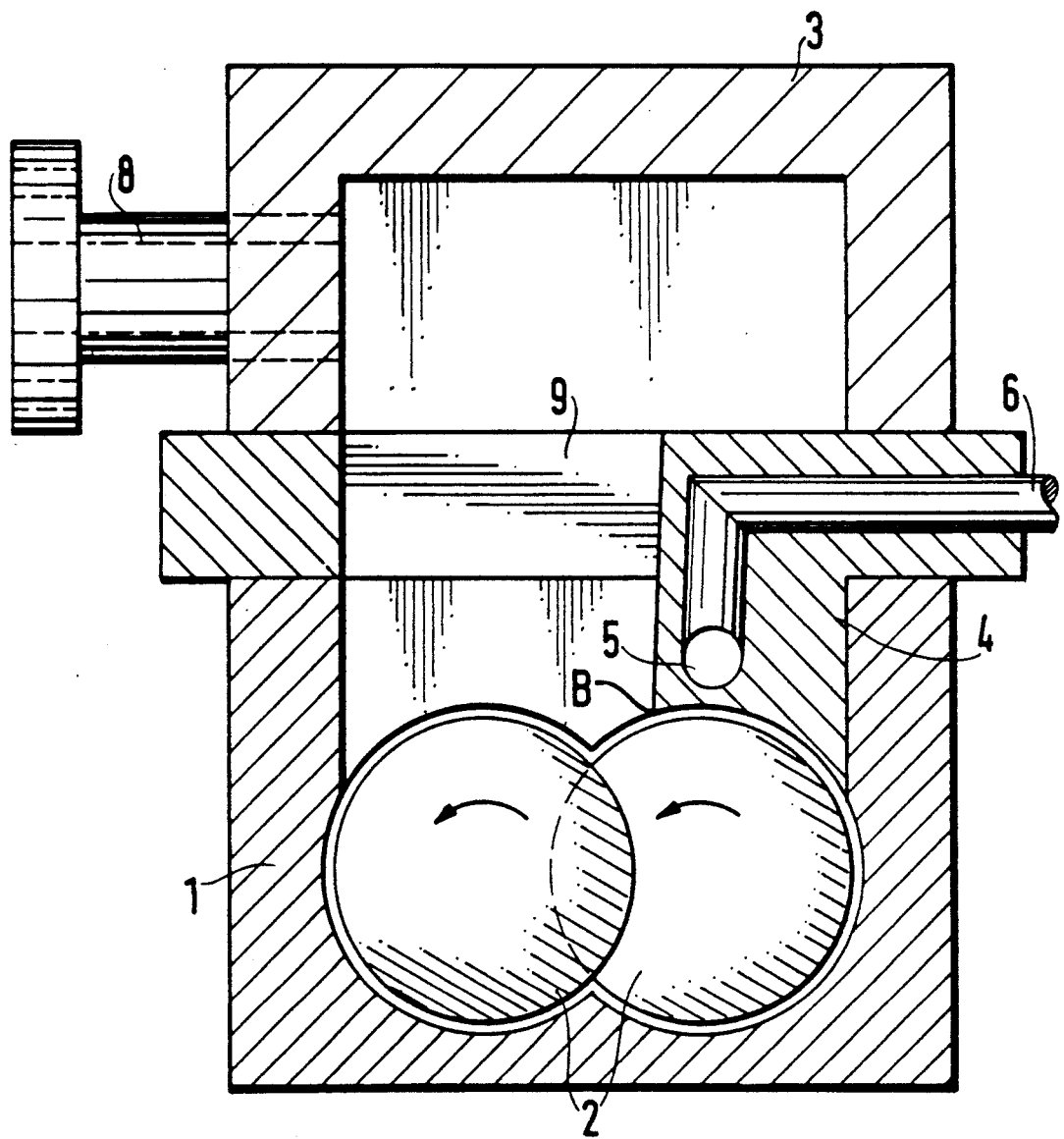
FIG. 2 is a sectional view taken along line I—I in FIG. 1.

The invention is concerned with the apparatus and process of treatment of the plastic melt in a degassing zone Z. The degassing zone Z can be one of a number of such degassing zones located along the length of the extruder. In the degassing zone Z, the housing 1 is provided with an opening 9 for escape of gases from the melt and above the opening 9 a degassing dome 3 is mounted on the housing 1. A degassing unit 4 is mounted on the housing 1 beneath the degassing dome 3. The degassing unit 4 extends over the length $L_1$ of the opening 9. A channel 5 is provided in the degassing unit and the channel 5 is connected to inlet 6 and outlet 7 for conveying a fluid heating medium through the channel. The channel 5 extends over a length $L_2$ representing the distance between inlet 6 and outlet 7 and corresponding substantially to the length of the degassing unit 4. The channel 5 extends in proximity to a surface of the degassing unit which lies closely adjacent to the outer surface of the threads of a screw 2. In FIG. 2 the degassing unit 4 is disposed above the screw 2 at the right and its lower surface faces the threads of the screw and conforms in shape thereto. The degassing unit 4 cooperates with the screws to advance and guide the plastic melt in its longitudinal advance in the degassing zone while also providing a passage via opening 9 for escape of gas from the melt to the dome 3. The surfaces of the degassing unit 4 are polished in order to reduce adhesion forces.

The dome 3 has an outlet 8 for discharge of gases from the degassing zone Z. A suction pump (not shown) can be connected to outlet 8 to facilitate the discharge of gas from the dome.

Figure 3:
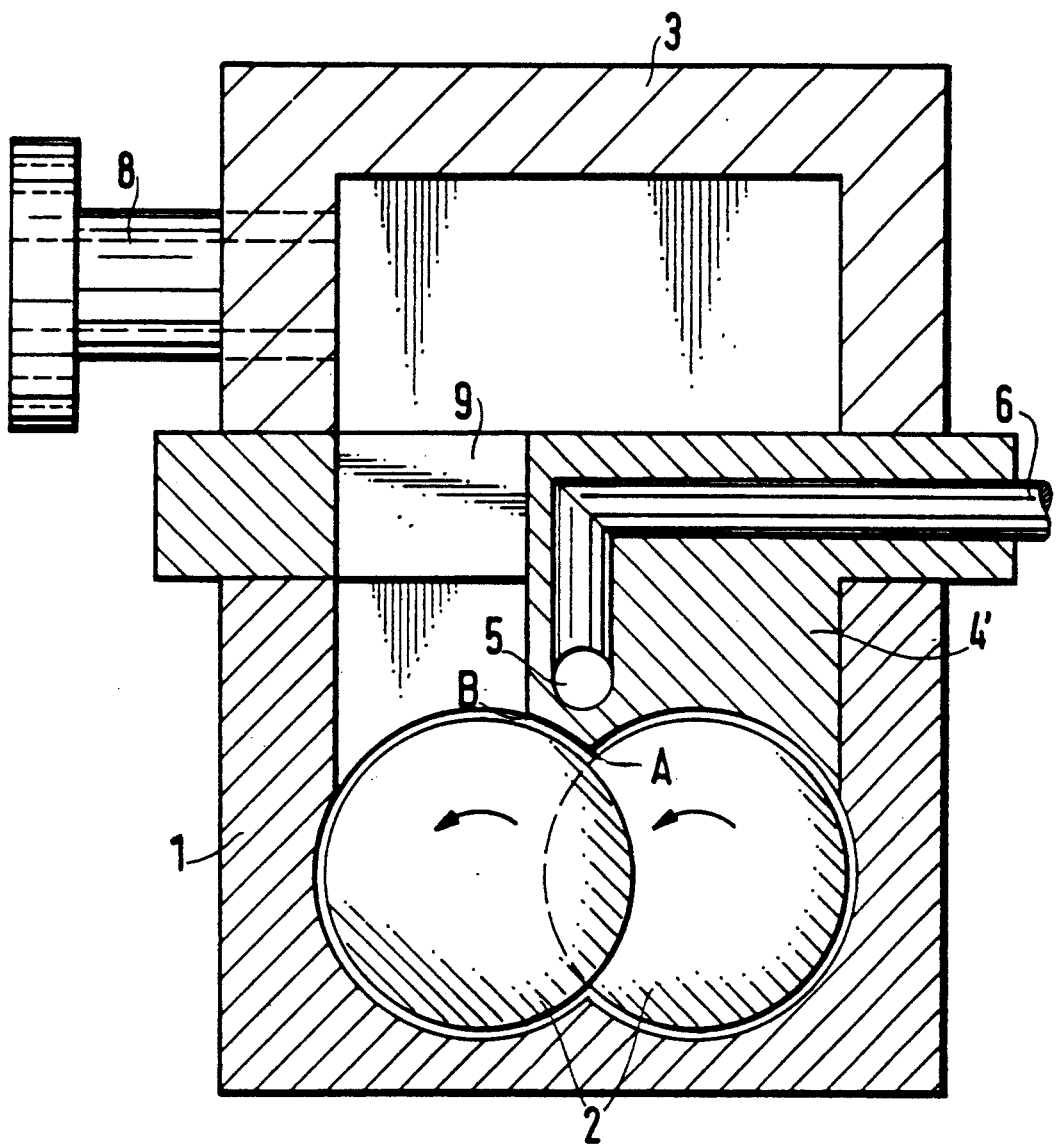
FIG. 3 is similar to FIG. 2 for a double screw extruder unit.

In FIG. 3, the degassing unit 4' extends completely over the screw 2 at the right and partially over the screw at the left. The overlapping threads of the adjacent screws 2 form a wedge-like contour at the nip where the threads begin to overlap. The degassing unit 4' has a surface facing the threads which is of corresponding contour and defines an edge or corner region A in the form of a cusp and an edge or corner region B at the boundary of the opening 9 for escape of gas. In FIG. 2, the surface of the degassing unit facing the screw is formed with a single edge or corner region B. In both embodiments, the channel 5 is located in proximity to the edge or corner regions A and B to heat them and prevent accumulation of plastic melt particles. It is at these edges or corners where the plastic melt particles tend to agglomerate as these are the locations of maximum polymer and gas flow.

In operation, before the screw extruder is supplied with plastic material at inlet 12, the degassing unit 4 or 4' is heated by the heating medium, for example, heated oil conveyed through heating channel 5, to a temperature which is at least as high as the melt temperature of the plastic material to be treated. For example, if the melting point of the plastic material to be treated is 280° C., then before the treatment process is begun, the edge or corner regions of the degassing unit 4 or 4' are preheated to approximately 300° C. During the treatment process, the heating of the degassing unit continues so that the surface of the degassing unit facing the screws, especially the corners or edges thereof are at a temperature which is equal to or higher than the melting point of the respective plastic material.

Thereby depositions of separated plastic material from the melt can no longer form on the outer surface of the degassing unit 4 or 4' even during start-up when most deposits were previously formed on the degassing units, since the outer surface of the degassing unit is now hotter than the melting point of the plastic particles.

Since particles entrained with the gas flow occur first, for the most part, at the corners or edges of the degassing unit, the particles are liquified and are returned from the corner or edge regions into the plastic melt whereby the degassing dome remains essentially free of depositions.

Although the invention has been described with reference to specific embodiments thereof, it will become apparent to those skilled in the art that numerous modifications and variations can be made within the scope and spirit of the invention as defined in the attached claims.

What is claimed is:

1. A process for degassing plastic melt in a screw extruder in which the plastic melt is advanced in a housing by a screw, an opening is provided in the housing for escape of gas and a degassing unit is arranged at the opening to extend over the length of the opening and partially cover the screw along said length to guide the flow of plastic melt and provide a passage for the gas flow, said process comprising heating the degassing unit to a temperature at least equal to the melting point of the plastic melt to liquefy plastic from the melt which contacts the degassing unit and return the liquefied plastic to the melt, the degassing unit having a corner or edge region bounding said passage and located on said degassing unit at a distance from said housing, said corner or edge region being in facing and closely adjacent relation to said screw, said heating being effected by passing a heating medium through said degassing unit in proximity to said corner or edge region longitudinally of the screw and lengthwise of said opening.

2. A process as claimed in claim 1, wherein said degassing unit is heated before the plastic melt is advanced in the extruder past said opening.

3. A process as claimed in claim 1, wherein said heating medium is a fluid.

4. A process as claimed in claim 1, comprising effecting said heating directly adjacent to said corner or edge region.

5. A process as claimed in claim 1, comprising effecting said heating of the degassing unit by conveying said heating fluid substantially over the entire length of the opening in the housing.

6. A process as claimed in claim 1 wherein the screw extruder has two screws with overlapping threads, said corner or edge region of the degassing unit being adjacent to a nip formed by the two screws where the threads begin to overlap, said process further comprising conveying said heating medium through said degassing unit in proximity to said corner or edge region and said nip.

7. A process as claimed in claim 1, wherein said heating medium is a liquid.

8. Apparatus for degassing plastic melt in a screw extruder in which the plastic melt is advanced in a housing by a screw which is rotatable about an axis, said housing having an opening for escape of gas, and a degassing unit operatively associated with the housing at said opening to face said screw for guiding the flow of plastic melt and provide a passage for flow of said gas from the housing, said degassing unit including a portion extending within said opening in said housing and having a surface facing said screw over the length of said opening and means for heating said degassing unit, at least at said surface facing the screw, to a temperature which is at least as high as the melting point of the plastic melt, said means for heating said degassing unit comprising means for conveying a heated fluid medium through said degassing unit longitudinally of said screw and lengthwise of said opening in proximity to said surface of the degassing unit facing the screw.

9. Apparatus as claimed in claim 8, wherein said means for conveying a heated fluid medium comprises a channel in said portion of the degassing unit proximate said surface thereof facing said screw.

10. Apparatus as claimed in claim 9, wherein said channel extends over substantially the entire length of said opening.

11. Apparatus as claimed in claim 10 wherein said channel extends substantially parallel to said screw.

12. Apparatus as claimed in claim 9, wherein said degassing unit has a corner or edge region facing and closely adjacent to said screw, said channel being disposed in said degassing unit in proximity to said corner or edge region, said corner or edge region being located on said degassing unit at a furthest position therein from said housing.

13. Apparatus as claimed in claim 12, wherein the extruder has a second screw adjacent to the first said screw, said first and second screws having overlapping threads, said surface of said degassing unit extending adjacent to at least one of said screws and defining at least one said corner or edge region, said channel being adjacent to said corner or edge region.

14. Apparatus as claimed in claim 13, wherein said surface of the degassing unit adjacent to both screws and corresponds in shape to the facing surfaces of the two screws to define two corner or edge regions, said channel being disposed in proximity to both corner or edge regions of the surface of the degassing unit.

15. Apparatus as claimed in claim 13 wherein said first and second screws define a nip where the threads thereof begin to overlap, said channel being in proximity to said nip.

16. Apparatus as claimed in claim 9, wherein said means for conveying heated medium through the degassing unit comprises an inlet and an outlet for said medium in said degassing unit, said channel being connected to said inlet and outlet.

17. Apparatus as claimed in claim 8, wherein said surface of the degassing unit, which faces the screw and is proximate to said heated fluid medium, bounds said passage and is located at a maximum distance from said housing.

18. Apparatus as claimed in claim 17, wherein said surface of the degassing unit forms a corner or edge region.

19. Apparatus as claimed in claim 18, wherein said degassing unit has an elongated cross section with a length dimension in the direction of the screw which is greater than a width dimension measured transversely in the opening in said housing.

* * * * *